April 24, 1928.

G. A. PEACOCK

SHOCK ABSORBER

Filed Oct. 27, 1926

1,667,047

INVENTOR
GEORGE A. PEACOCK
BY Charles S. Evans
HIS ATTORNEY.

Patented Apr. 24, 1928.

1,667,047

UNITED STATES PATENT OFFICE.

GEORGE A. PEACOCK, OF OAKLAND, CALIFORNIA.

SHOCK ABSORBER.

Application filed October 27, 1926. Serial No. 144,417.

My invention relates to shock absorbers for automobiles and other vehicles in which the body is supported by springs.

An object of my invention is to provide a shock absorbing and rebound checking device whose action is proportional to the extent to which the springs of the vehicle are compressed.

The invention possesses other features of advantage, some of which, with the foregoing, will be set forth in the following description of the preferred form of my invention which is illustrated in the drawings accompanying and forming a part of the specification. It is to be understood that I do not limit myself to the showing made by the said drawings and description, and I may adopt variations of the preferred form within the scope of my invention as set forth in the claims.

Referring to the drawings, Fig. 1 is a view of my improved shock absorber in connection with the frame and front axle of an automobile on which it is arranged.

Figure 2:
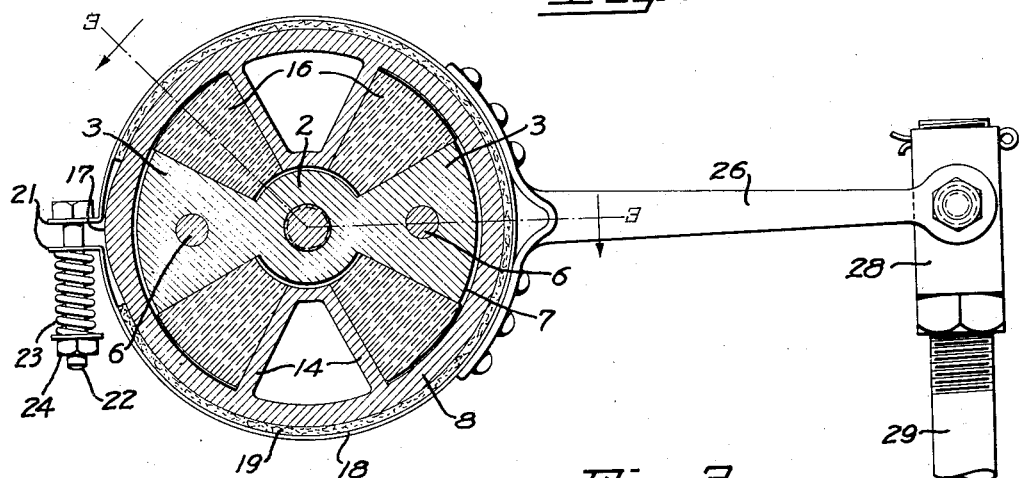
Fig. 2 is a vertical sectional view showing in greater detail the construction of the device.
Figure 3:
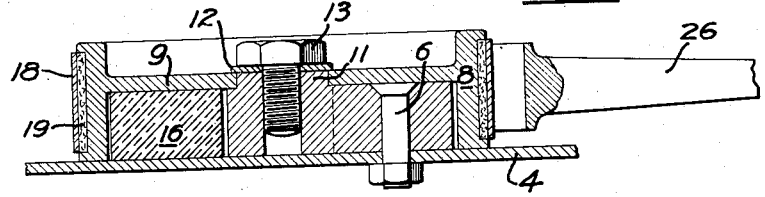
Fig. 3 is a compound sectional view, the planes of section being indicated by the line 3—3 of Figure 2.
Figure 1:
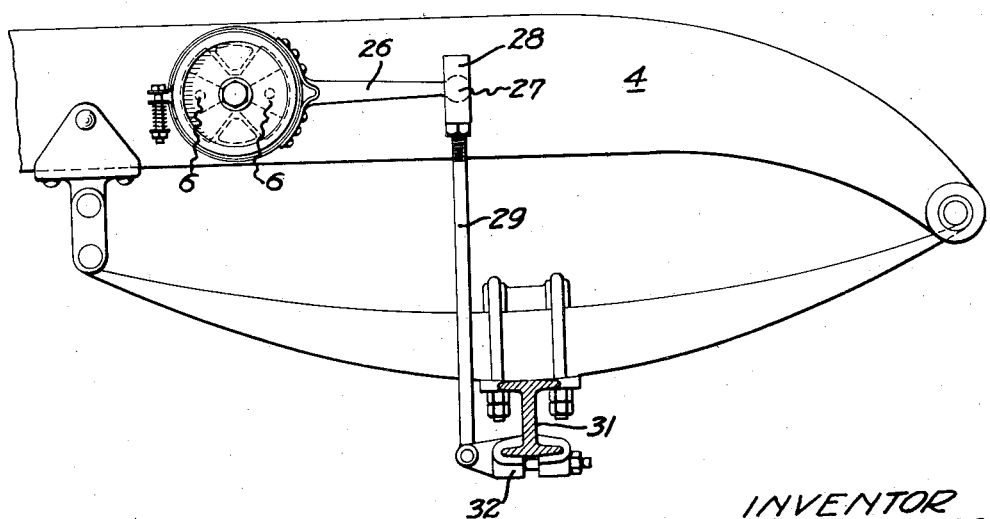

Broadly considered, my invention comprises a friction band mounted upon a cylindrical drum, over one part of the periphery of which, is a cam, or portion of greater radius, and this portion is preferably symmetrical about a radial line; that is, the cam portion increases in radius from the drum to the middle point and then decreases back to the drum. The ends of the lining of the friction band are preferably though not necessarily cut away or relieved, so that the band bears only upon the cylindrical surface of the drum when they are in their normal relative positions. When the spring of the vehicle is compressed or extended, the band is turned upon the drum, and rides up upon one side or the other of the cam. Thus, the greater this displacement the tighter the band becomes upon the drum, and the more resistance is offered to any further turning. Therefore the energy exerted by the device, in absorbing shocks or checking rebound, is proportional to the magnitude of the shock. The advantage of such a feature is that when a small bump is passed over, the shock absorber offers little or no resistance to the normal spring action, and therefore does not detract from their maximum resilience. When a wheel of the vehicle encounters a large bump, however, the increased movement between the drum and band brings the cam into play to absorb the shock and check the rebound.

Another advantage of my improved shock absorber is that its action in absorbing shocks and checking rebound is proportional also to the load in the vehicle. The device is so adjusted that when only one person is in the vehicle, the high point of the cam is midway between the ends of the friction band. When the vehicle is more heavily loaded, however, the friction band is displaced upon the drum, with the result that a certain amount of the cam is forced under the friction lining, and the frictional resistance to relative motion between the two is automatically increased. Then when a bump is encountered, the shock absorber automatically offers more resistance than when the vehicle is more lightly loaded.

The present embodiment of my invention comprises a hub 2 having arms 3, preferably integral therewith and fixedly attached to the frame 4 of the vehicle by means of the bolts 6. The extremities 7 of these arms are made arcuate; and mounted for rotary movement about them is the drum 8, having the web 9, which is bored centrally to permit it to ride upon a stud 11, extending from the hub. The drum is retained on the hub by the washer 12 and cap screw 13 threaded into the stud. Integral with the drum are the inwardly extending segments 14, disposed in alternation with the hub arms 3. Cushioning means 16 completely fill each of the spaces intervening between the hub arms and the segments. These cushioning means are preferably of rubber, formed into segmental blocks to fit the spaces into which they are pressed.

While the inner circumference of the drum is preferably formed round, so as to make it revoluble about the arm extremities; the outer circumference is formed with the cam 17, so that at this point the outside radius of the drum gradually increases from both sides of the cam to the high point of the cam at its center so as to provide a gradual slope.

A split band 18 surrounds this drum and is provided with suitable friction lining 19. The friction lining extends over substantially the entire cylindrical portion of the drum but is relieved or cut away for a short distance on both sides of the cam 17, so that in normal operation of the vehicle over smooth roads, the cam is not operative.

Means are provided for adjusting the tension of the band upon the drum. The ends 21 of the band are turned outwardly and connected by the bolt 22. A spring 23 is interposed between the ends 21 of the band by inserting it between the nut 24 on the bolt and one of the band ends, thus tending to press the ends together and draw the band snugly about the drum. Tightening or loosening the nut adjusts the tension of the spring.

Extending from the band 18 is the bracket arm 26, which terminates in the ball 27, adapted to seat in the socket 28 in the link 29, pivotally attached to the axle 31 of the vehicle by the clamp 32.

When one of the wheels of a vehicle equipped with my shock absorbers strikes a bump, the axle 31 is forced upwardly, carrying with it the link 29 and the end of the bracket 26. This causes the band 18 to turn, and because of its pressure upon the drum 8, the segments 14 turn with it about the hub 2. Thus certain of the cushioning blocks 16 are deformed between segments 14 and arms 3, and because of their resilience, they absorb part of the shock.

In shocks of a minor nature the relation between the band 18 and the drum 9 remains undisturbed, due to the frictional resistance offered by the friction band 19. However, when a heavy shock is transmitted so that the cushioning blocks 16 reach the limit of their deformability, the frictional resistance of the band is overcome sufficiently to allow the band to move relative to and upon the drum. It can readily be seen that on account of the shape of the cam, the greater this relative motion, the tighter the band will become, and the greater the resistance to further turning. Thus a shock absorber is provided which automatically offers resistance to shocks in direct proportion to their magnitude.

Similarly, as the spring of the vehicle resumes its normal position, the parts of the shock absorber also are forced back into their normal relative positions, which necessitates that the frictional resistance between the drum and band must be overcome again. Therefore, the device acts also as a rebound check; the combination of its effects not only adding very materially to the easy riding qualities of the vehicle, but also tending to avoid spring breakage and other mechanical difficulties.

While in the present embodiment of my shock absorber the cam 17 extends over only about 45 degrees of the periphery of the drum, obviously it may be enlarged to cover a greater arc, even, perhaps, to the extent of 180 degrees. The reason for so enlarging the cam is to present a larger surface to the increased friction, thereby decreasing the friction per unit area, and tending to lengthen the life of the friction lining.

I claim:

1. A shock absorber for vehicles comprising a hub having arms thereon, a drum mounted for rotary movement about said hub and having arms spaced between the arms of the hub, cushions filling the space between the arms to resiliently resist relative rotary movement between the hub and drum, a band frictionally engaging the drum and adapted to be mediately connected to the axle of the vehicle, and means for increasing the frictional resistance to rotary movement of the band on the drum proportionally to the extent of such movement.

2. A shock absorber for vehicles comprising a hub having arms thereon, a drum mounted for rotary movement about said hub and having arms spaced between the arms of the hub, cushions filling the space between the arms to resiliently resist relative rotary movement between the hub and drum, a band frictionally engaging the drum and adapted to be mediately connected to the axle of the vehicle, and a gradually sloping cam projection on said drum for tightening the band when rotary movement of the band on the drum occurs.

3. A shock absorber for vehicles comprising a hub having arms thereon, a drum mounted for rotary movement about said hub and having arms spaced between the arms of the hub, cushions filling the space between the arms to resiliently resist relative rotary movement between the hub and drum, a split band surrounding the drum and adapted to be mediately connected to the axle of the vehicle, a spring for pressing the ends of the band together, means for varying the tension of said spring, a gradually sloping cam projection on said drum for tightening the band when rotary movement of the band on the drum occurs, and a friction lining between the band and the drum on each side of the cam.

4. A shock absorber for vehicles comprising a plurality of elements mounted for relative motion, one affixed to the frame of the vehicle and means operatively connecting another to the axle of the vehicle, said elements having spaced projections thereon, cushioning means filling the space between the projections and a gradually sloping cam projection on one of said elements adapted to engage another of said elements when said relative motion occurs.

In testimony whereof, I have hereunto set my hand.

GEORGE A. PEACOCK.